April 4, 1944.  D. S. HARP  2,345,811
HYDRAULIC BRAKE AUTOMATIC ADJUSTER
Filed Aug. 11, 1942
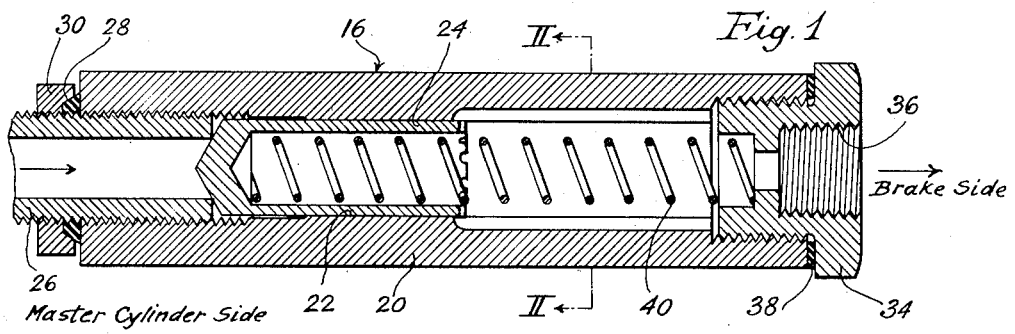
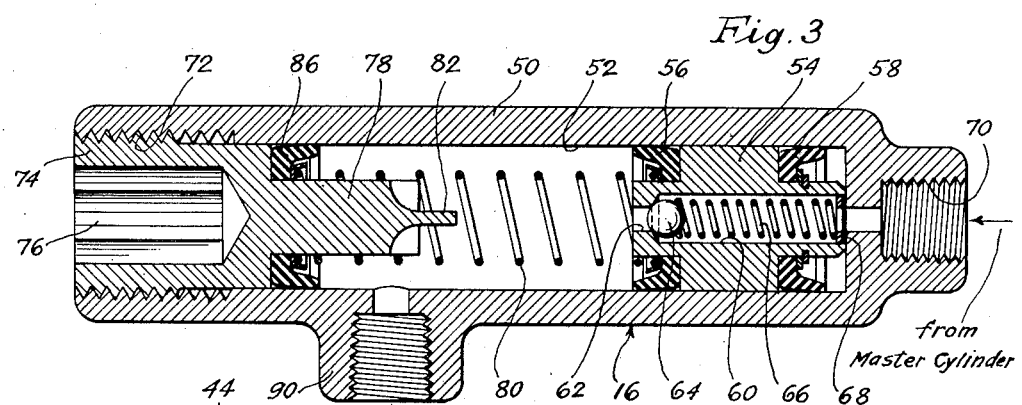
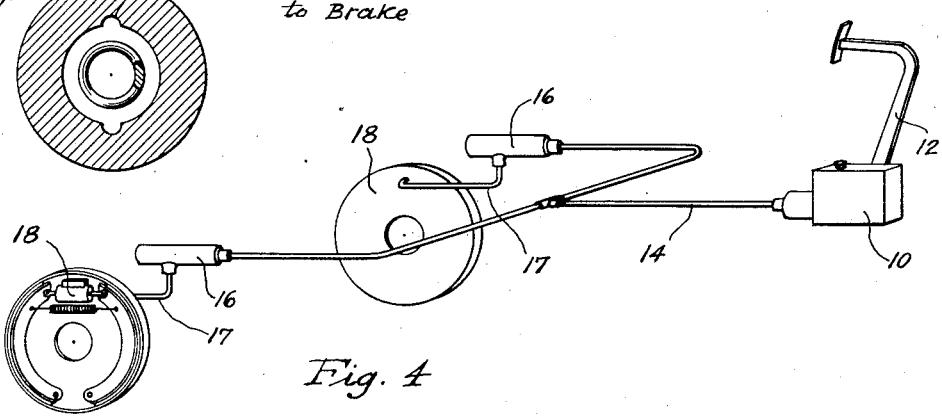
Inventor
Dallas S. Harp
By
Attorney Patented Apr. 4, 1944

2,345,811

UNITED STATES PATENT OFFICE 2,345,811

HYDRAULIC BRAKE AUTOMATIC ADJUSTER

Dallas S. Harp, Akron, Ohio, assignor to Wingfoot Corporation, Akron, Ohio, a corporation of Delaware Application August 11, 1942, Serial No. 454,368

2 Claims. (Cl. 188—152)

This invention relates to adjusters for hydraulic brakes, and, more particularly, is concerned with hydraulic brake adjusters adapted to automatically provide the proper clearance between relatively stationary and movable braking surfaces.

Heretofore it has been recognized that it is advantageous to provide a substantially uniform clearance between a brake drum or other surface and the friction means which engages during the braking operation with the drum or other surface. A uniform clearance provides a quick constant uniform type of brake action. Various complicated mechanisms have already been provided for this purpose, but I have found that known mechanisms are open to various objections which include high initial and maintenance costs, difficulties of adjustment and operation, and the danger of permitting the passage of fluid in such amounts through the adjusters that the brakes become locked and cannot be released. Further, no prior art hydraulic brake adjusters provide relatively simple, practical, easily adjusted and operated, and inexpensive means whereby the adjuster can be adapted to provide any desired brake clearance and which will function over long periods to automatically establish this clearance after each braking operation.

It is the general object of my invention to avoid and overcome the foregoing and other difficulties of and objections to known types of hydraulic brake adjusters by the provision of improved relatively inexpensive, easily manipulated brake adjusters which will establish and maintain automatically and over long periods any desired clearance between hydraulic braking elements whereby the proper and uniform functioning of the brake is substantially assumed.

Another object of my invention is the provision of a hydraulic brake adjuster characterized by a piston and cylinder combination wherein any necessary quantity of hydraulic fluid can be passed through the adjuster into the brake to obtain the proper braking action, and with the adjuster functioning to trap the same but an adjustable amount of fluid in the brake unit after each operation of the brake.

Another object of my invention is the provision of an improved hydraulic brake adjuster unit.

The foregoing and other objects of my invention are achieved by the provision of a hydraulic brake adjuster including a cylinder having an opening at one end adapted to receive a conduit extending to a master cylinder, the other end of the cylinder having an opening associated therewith and adapted to receive a conduit extending to a hydraulic brake, a piston slidably received in the cylinder, means resiliently urging the piston towards the master cylinder end of the cylinder, means for by-passing the piston with fluid when the piston has moved almost completely towards the brake end of the cylinder, and adjustable means associated with the piston so that it will always trap the desired amount of fluid within the cylinder upon movement of the piston to the master cylinder end of the cylinder whereby proper clearance is provided between the braking surfaces in the brake unit.

For a better understanding of my invention reference should be had to the accompanying drawing wherein Fig. 1 is a longitudinal cross section of an adjuster comprising one embodiment of my invention; Fig. 2 is a transverse cross sectional view taken substantially on line II—II of Fig. 1; Fig. 3 is a view similar to Fig. 1 but illustrating another embodiment of my invention; and Fig. 4 is a diagrammatic perspective view of a hydraulic braking system incorporating the brake adjusters of my invention.

Referring first to Fig. 4 of the drawing, the numeral 10 indicates generally a master cylinder in a hydraulic brake system, and adapted to be operated by any suitable means, for example, a foot brake lever 12. A conduit 14 extends from the master cylinder to the automatic brake adjuster 16 of the present invention, and through a conduit 17 to any suitable known type of hydraulic brake indicated generally by the numeral 18. In Fig. 4 I have illustrated the conduit 14 formed into two branches and extending through a pair of individual brake adjusters 16 to individual hydraulic brakes 18. Of course, any number of hydraulic brakes may be operated by a single master cylinder of requisite capacity, but I have found it advisable to incorporate an automatic brake adjuster with each individual brake unit, in the manner particularly illustrated in the drawing.

Having reference now to Figs. 1 and 2 of the drawing and the embodiment of my invention illustrated therein, the numeral 16 indicates generally the adjuster unit including a cylinder 20 having a bore 22 slidably receiving a piston 24. The cylinder 20 has the bore 22 threaded at one end to receive a nipple 26 formed with a complementary thread, so that the nipple 26 may be screwed into and out of the end of the cylinder 20 to a greater or less amount. The nipple 26 is sealed and locked in any desired adjusted axial position at the end of the bore 22 in the cylinder 20 by means of a suitable gasket 28 and lock nut 30. The nipple 26 is adapted to be secured by suitable coupling means (not shown) to a conduit, such as the conduit 14 extending to the master cylinder 10.

The other end of the cylinder 20 is provided with a suitably tapped counterbore adapted to receive a threaded plug 34 which in turn is formed with a tapped opening 36 adapted to receive the threaded end of a conduit 17 extending to a hydraulic brake, such as the hydraulic brake 18. A sealing washer 38 may be provided between the plug 34 and the end of the cylinder 20.

The piston 24 is normally resiliently urged towards the master cylinder end of the cylinder 20, and this is conveniently achieved by the use of a light weight coiled spring 40 positioned between the plug 34 and extending inside of the piston 24 and engaging with the head of the piston. Conveniently, the head of the piston 24 is made in the shape of a cone, and is adapted to have sealing engagement with a valve seat at the end of the nipple 26 so as to positively shut off the flow of oil in a direction from right to left of Fig. 1 of the drawing. The piston 24 has a good sliding seal with the bore 22 of the cylinder but if the brake is not operated over long periods of time some leakage past the piston might occur. Hence the provision of the valve seat between the conical end of the piston and the nipple 26. Also, the bore 22 of the cylinder 20 is provided with one or more, and usually two, longitudinally extending grooves 44 which run from the brake end of the cylinder towards the other end for a distance slightly greater than the length of the piston 24.

In the operation of the brake adjuster embodiment of my invention just described, the nipple 26 is connected to the master cylinder, and the plug 34 is connected to the brake. Now, when the master cylinder is actuated fluid is forced into the nipple 26 and against the conical end of the piston 24. This causes the piston 24 to move to the right hand side of Fig. 1 of the drawing against the action of the compression spring 40. The movement to the right of the piston 24 forces any braking fluid present in the cylinder 20 out through the plug 34 and into the braking element. If the amount of braking fluid to the right hand side of the piston 24 is reduced by leakage, or the like, then the piston 24 will move completely to the right hand end of the cylinder 20 and against the left hand end of the plug 34. At this time the grooves 44 will be uncovered inasmuch as they extend farther in a longitudinal direction than the axial length of the piston 24. When these grooves 44 are uncovered by the movement of the piston 24 completely to the end of its stroke, then fluid under pressure from the master cylinder will flow in to the nipple 26 down through the bore 22 of the cylinder 20, through the grooves 44 and out through the plug 34 into the braking unit to achieve the desired braking effect. The right hand end or skirt of the piston 24 may be formed with a scalloped edge, or other suitable grooved passageways may be provided to insure the flow of fluid through the grooves 44 and under the piston skirt into the plug 34 when the piston 24 has moved completely to the right hand end of its travel.

Now when the pressure on the fluid in the master cylinder is relieved, the spring normally associated with the braking unit (see Fig. 4, for example) tends to move the fluid away from the braking unit and back into the cylinder 20 through the plug 34. Also, the compression spring 40 moves the piston 24 back until the left hand end of the piston engages with the end of the nipple 26 to stop the movement of the piston and to provide a seal preventing the further flow of fluid. It will be seen that the piston 24 accordingly functions as a stop and valve to trap a desired amount of fluid between the piston 24 and the braking unit so that the braking surfaces associated with the brake unit will have the desired clearance, usually between .005 and about .02 inch. By appropriately moving the nipple 26 in or out of the end of the cylinder 20, the exact point at which the piston 24 will be stopped and the seal obtained can be altered. Thus, the amount of fluid trapped between the piston 24 and the braking unit can be adjusted and determined, and the exact amount of clearance between the braking element or surfaces can be adjusted.

Turning now to the improved form of my invention illustrated in Fig. 3, the numeral 16 indicates the structure generally, and including a cylinder 50 having a bore 52 slidably receiving a piston 54 provided with oppositely extending flexible rubber or other sealing cups 56 and 58. The piston 54 is provided with an axial passage 60 terminating in an apertured valve seat 62 against which a ball 64 is releasably pressed by a compression spring 66. A washer 68, suitably secured in the end of the passage 60 remote from the valve seat 62, serves to hold the spring 66 in the passage 60.

The right hand end of the cylinder 50 may be formed with a reduced diameter and is provided with a suitably tapped socket 70 adapted to receive a conduit extending to the master cylinder. The other end of the cylinder 50 is suitably tapped, as at 72, and receives a threaded plug 74 having a socket 76 adapted to receive the end of a tool so that the plug 74 may be screwed into or out of the cylinder 50 to a greater or lesser amount. The plug 74 carries a post 78 of reduced diameter, and a compression spring 80 surrounding the post and extending into engagement with the piston 54 serves to normally resiliently urge the piston 54 towards the right hand, or master cylinder end, of the cylinder 50.

The post 78 of the plug 74 is formed with an axially positioned pin 82 adapted to extend through the apertured valve seat 62 of the piston 54 and engage with the ball 64 and move it off of the valve seat when the piston 54 has moved to the left of the cylinder 50. A sealing cup 86 surrounds the post 78 of the plug 74 and engages with the inside of the bore 52 of the cylinder 50 so as to prevent the leakage of fluid around the plug 74. Completing the combination of parts is a boss 90 formed integral with one side of the cylinder 50, and suitably tapped and apertured so as to receive the end of the conduit adapted to extend to the braking unit or cylinder so that fluid can flow to and from the braking unit and the cylinder 50, in the manner that will be clearly understood.

The operation of the embodiment of my invention illustrated in Fig. 3 is quite similar to that above described. More specifically, when the master cylinder of the system is actuated, fluid under pressure flows in through the right hand end of the cylinder 50 and moves the piston 54 towards the left hand side of this figure. This movement of the piston 54 compresses the fluid inside of the cylinder 50 and forces the fluid out to the brake unit cylinder. If there is sufficient fluid in the brake cylinder and in the cylinder 50 to achieve the desired braking action the piston 54 will stop somewhat short of causing an engagement between the pin 82 and the ball 64. However, if for some reason there is not sufficient braking fluid in the brake cylinder or in the cylinder 50 to achieve the desired braking action the piston 54 is moved to the left of Fig. 3 until the pin 82 of the plug 74 engages with the ball 64 and causes the ball to move off its seat. Thereupon fluid from the master cylinder will flow through the passage 60 in the piston 54 down beneath the ball 64 and through the aperture of the valve seat 62 and on to the brake cylinder until the desired amount of fluid has been passed to the brake cylinder to achieve the desired braking action.

Now when the master cylinder is released, the spring associated with the brake cylinder unit and the spring 80 in the adjuster cylinder 50 of my invention cooperate to move the piston 54 back to the right-hand end of the cylinder 50 and to return the braking fluid from the brake cylinder to the adjuster cylinder 50. The amount of fluid trapped within the brake cylinder, in the conduit 17 to the adjuster cylinder 50, and in the cylinder 50 determines the clearance between the braking surfaces in the brake unit. Then, by suitably adjusting the position of the plug 74 so as to determine the exact point in the movement of the piston 54 at which the pin 82 will open the ball valve 64, the amount of fluid trapped in the brake end of the piston can be controlled and determined so as to achieve exactly the desired clearance between the braking surfaces of the brake unit. Accordingly, any desired amount of clearance, such as usually about .01 inch, can be obtained.

From the foregoing it will be recognized that the various objects of my invention have been achieved by the provision of relatively simple, inexpensive, easily operated and adjusted automatic brake adjusting means for insuring a constant clearance between the braking surfaces of a hydraulic brake unit. The brake adjuster is readily applied to substantially any type of hydraulic brake unit, can be quickly adjusted to give substantially the exact degree of clearance between braking surfaces desired, and will operate over long periods with little or no attention and to maintain the desired clearance between braking surfaces.

While in accordance with the patent statutes I have specifically illustrated and described certain best known embodiments of my invention, it should be particularly understood that I am not to be limited thereto or thereby, but that the scope of my invention is defined in the appended claims.

I claim:

1. A hydraulic brake adjuster including a cylinder having an opening at one end adapted to receive a conduit extending to the master cylinder, the other end of the cylinder having an opening associated therewith and adapted to receive a conduit extending to a hydraulic brake, a piston slidably received in the cylinder in fluid tight relation therewith, means resiliently urging the piston towards the master cylinder end of the cylinder, a resiliently closed ball check valve carried by the piston and adapted when open to pass fluid through the piston, and a pin adjustably carried in sealed relation with the brake end of the cylinder and adapted to move the ball valve off its seat when the piston has moved almost completely towards the brake end of the cylinder, whereby proper clearance can be provided between the braking surfaces in the hydraulic brake upon the adjustment of the position of the pin, said pin being adjustable from the outside of the cylinder.

2. A hydraulic brake adjuster including a cylinder having an opening at one end adapted to receive a conduit extending to the master cylinder, the other end of the cylinder having an opening associated therewith and adapted to receive a conduit extending to a hydraulic brake, a piston slidably received in the cylinder in fluid tight relation therewith, means resiliently urging the piston towards the master cylinder end of the cylinder, a resiliently closed check valve carried by the piston and adapted when open to pass fluid through the piston, and a pin adjustably carried in sealed relation with the brake end of the cylinder and adapted to move the check valve off its seat when the piston has moved almost completely towards the brake end of the cylinder, said pin being adjustable from the outside of the cylinder.

DALLAS S. HARP.